United States Patent
Stetson (12)

(10) Patent No.: US 10,433,657 B1
(45) Date of Patent: Oct. 8, 2019

(54) LOW TEMPERATURE MERCHANDISER SYSTEM AND METHOD OF USE

(71) Applicant: Marcus Stetson, Bernardston, MA (US)

(72) Inventor: Marcus Stetson, Bernardston, MA (US)

( * ) Notice: Subject to any disclaimer, the term of this patent is extended or adjusted under 35 U.S.C. 154(b) by 0 days.

(21) Appl. No.: 15/712,059

(22) Filed: Sep. 21, 2017

Related U.S. Application Data

(63) Continuation of application No. 14/086,134, filed on Nov. 21, 2013, now abandoned.

(60) Provisional application No. 61/728,827, filed on Nov. 21, 2012.

(51) Int. Cl.
*A47F 3/04* (2006.01)

(52) U.S. Cl.
CPC ..................... *A47F 3/04* (2013.01)

(58) Field of Classification Search
CPC ................. A47F 3/04; B64D 11/04
USPC .................. 62/255, 132, 237, 382
See application file for complete search history.

(56) References Cited

U.S. PATENT DOCUMENTS

| | | | |
|---|---|---|---|
| 3,468,369 A * | 9/1969 | Reed | A23L 3/363 |
| | | | 165/63 |
| 3,507,322 A * | 4/1970 | Reed | F16L 37/56 |
| | | | 165/61 |
| 4,509,339 A | 4/1985 | Mehlan et al. | |
| 4,539,819 A | 9/1985 | Alba | |
| 4,901,538 A * | 2/1990 | Anthony | B64D 9/00 |
| | | | 454/77 |
| 4,995,243 A * | 2/1991 | Ward | F25D 19/02 |
| | | | 62/298 |
| 5,513,500 A * | 5/1996 | Fischer | B64D 11/0007 |
| | | | 62/239 |
| 6,446,452 B2 * | 9/2002 | Durham | F25D 15/00 |
| | | | 62/239 |
| 8,056,349 B2 * | 11/2011 | Oswald | F25D 11/003 |
| | | | 62/186 |
| 8,936,260 B2 | 1/2015 | Burd | |
| 2008/0116773 A1 | 5/2008 | Van Loon | |

* cited by examiner

*Primary Examiner* — Frantz F Jules
*Assistant Examiner* — Steve S Tanenbaum
(74) *Attorney, Agent, or Firm* — Doherty Wallace Pillsbury + Murphy

(57) ABSTRACT

Disclosed herein is a low temperature merchandiser system specially configured for use in storing inventory to be kept at below about 10° Fahrenheit, and further relates to its method of use.

8 Claims, 9 Drawing Sheets

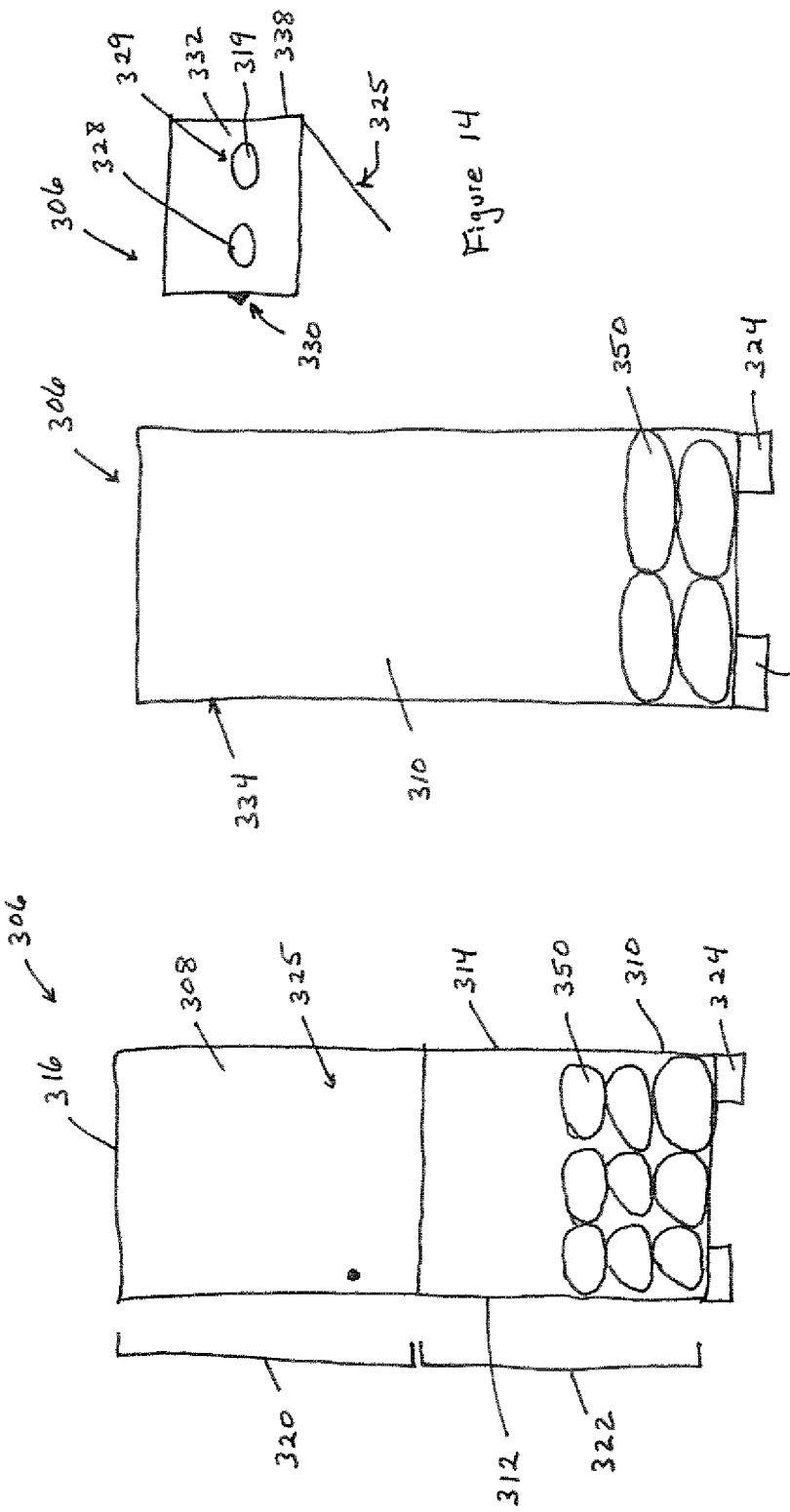

LOW TEMPERATURE MERCHANDISER SYSTEM AND METHOD OF USE

BACKGROUND OF THE INVENTION

1. Field of the Invention

This invention relates generally to the commercial refrigeration art, and more particularly to improvements in product merchandisers especially designed for low temperature refrigeration.

2. Description of Prior Art

Since about 1960 the commercial refrigeration industry has developed many food merchandisers having open front product display zones for the display and merchandising of frozen food products. Low-temperature merchandisers are designed with the primary objective of maintaining product temperatures in the display area at about 0° F. for frozen food and ice and at about 10° F. for ice cream. Low-temperature merchandisers are conventionally made out of metal and have a door located in the front of a housing through which bags of ice are removed by consumers after purchasing them at a gas station, grocery store, convenience store, and the like.

The problem with conventionally known low temperature merchandisers is that it is difficult to load inventory into the merchandiser's storage area as the inventory generally must be hoisted up by an individual and then maneuvered into an available space within the storage area. Another problem associated with typical low temperature merchandisers is that they waste a large amount of electricity in maintaining and regulating the internal temperature of the storage area.

Accordingly, what is needed is a merchandiser that is designed for easy loading and replacement of inventory, and which also reduces the amount of electricity needed to run the merchandiser at an appropriate temperature wherein such temperature is dependent upon the type of inventory stored in the merchandiser.

BRIEF SUMMARY OF THE INVENTION

The above-discussed problems are greatly reduced or alleviated by a low temperature merchandiser system which is used to store inventory such as, for example, bags of ice, for consumer purchase. In an exemplary embodiment the low temperature merchandiser system comprises a housing which opens via an access door into a chamber which holds the inventory. The chamber further holds a ramp such that when the access door is opened, the ramp may be pulled out from the chamber, and used to roll the inventory into the chamber. The housing further comprises an aperture which is configured to receive a power unit which includes the equipment necessary to cool the merchandiser's chamber. In an exemplary embodiment, the power unit is constructed as a self-contained unit which is removable from the housing, thereby allowing for the ready replacement of the power unit, which, therefore, eliminates downtime and loss of inventory otherwise resulting from a malfunctioning power unit.

In the event the power unit malfunctions and a backup power unit is unavailable, a screen may be disposed atop the aperture and dry ice may be sandwiched between the screen and a cover such that the dry ice sublimates to thereby cool the merchandiser's chamber.

The merchandiser system disclosed herein gives rise to a more efficient method of use which includes the use of totes to stack the ice bags and to transport them from the ice truck to the merchandiser. In an exemplary embodiment, a delivery person may roll the tote into the merchandiser and take away any empty totes. The delivery person may then take away the empty tote and bring it back to the truck. For inventory which may include, e.g., bags of ice, this process eliminates labor on the delivery person and prevents the need to use bailer bags which are large plastic bags into which 5 pound bags of ice typically are stored for transport. Eliminating the bailer bags prevents additional use of plastic and additional waste. This process, then, eases reloading, involves less strain and lifting, and involves considerably less time to transport the ice and to load the merchandiser.

In another exemplary embodiment, a low temperature merchandiser system comprises a power unit in operable engagement with one or more ice lockers, wherein the ice locker is designed to hold inventory including, e.g., ice. The power unit comprises a refrigeration pack in electrical and fluid communication with an evaporator coil. The refrigeration pack comprises a compressor, a condenser, a fan, and a power cord. Refrigerant lines connect the evaporator coil to the refrigeration pack.

The low temperature merchandiser system further comprises a cold air inlet plenum which is in fluid communication with the evaporator coil via a cold air inlet. A plurality of cold air distribution ports vertically extend from the cold air inlet plenum. Connected to each of the cold air distribution ports and extending vertically therefrom is a cold air inlet hose. A slide gate which controls the flow of air through the cold air distribution port is disposed on and/or between each of the cold air distribution ports and the cold air inlet hoses.

The merchandiser system further comprises a warm air return plenum which is in fluid communication with the evaporator coil via a warm air return. In an exemplary embodiment, the warm air return plenum is placed adjacent and parallel to the cold air inlet plenum. A plurality of warm air collection ports vertically extend from the warm air return plenum, wherein each collection port from the plurality is adjacent to and parallel to one of the cold air distribution ports, wherein each pairing of a warm air collection port and a cold air distribution port forms paired ports. Connected to each of the warm air collection ports, and extending vertically therefrom, is a warm air return hose. A slide gate, which controls the flow of air through the warm air collection port, is disposed on and/or between each of the warm air collection ports and the warm air return hoses. In an exemplary embodiment the warm air collection port and the cold air distribution port of each pair is in communication with a shared slide gate, wherein such shared slide gate simultaneously controls both the cold air supply and the warm air return to a single locker, thereby, reducing the possibility of closing or opening a flow of air from one side and not the other.

The merchandiser system further comprises a lid which is in fluid communication with the locker. The lid comprises a cold air connection opening and a warm air connection opening. A cold air inlet hose and an adjacently positioned warm air return hose are physically engaged with respective cold air connection opening and warm air connection opening of the lid. Cold air supplied by the power unit flows from evaporator coil, through the cold air inlet, and into the cold air inlet plenum. Provided that the slide gate is open, the cold air may then flow from the cold air inlet plenum through the cold air distribution port, through the cold air inlet hose and lid, and into the locker. Slide gates control warm air return and cold air supply on one gate. Warm air may be returned to the refrigeration pack by opening the slide gate which is in operable communication with the warm air return hose and the warm air collection port which are physically engaged with the lid. The warm air may then flow from the warm air collection port and into the warm air return plenum, through the warm air return, through the evaporation coil, and back into the refrigeration pack.

Depending on the number of warm air collection ports and cold air distribution ports, additional lockers may be added to the merchandiser system.

In this embodiment, it is contemplated that a delivery person may transport the locker which has been pre-filled with inventory, to the delivery site which holds the power unit. Upon arrival at the delivery site, the delivery person need only close off the flow of air from the power unit to an empty locker(s), disconnect the empty locker(s) from the power unit, connect the replacement locker(s) to the power unit, and then open the ports from the power unit to the replacement locker(s) to allow the flow of air between the locker(s) and the power unit.

In any of the embodiments, the merchandiser system may further comprise a canopy which shades the housing to thereby increase the life of the inventory and to decrease the amount of electricity necessary to keep the inventory cool.

BRIEF DESCRIPTION OF THE DRAWINGS

The benefits and advantages of the present invention will become more readily apparent to those of ordinary skill in the relevant art after reviewing the following detailed description and accompanying drawings, wherein:

FIG. 12 is a schematic depicting a front side of an exemplary locker;

FIG. 13 is a schematic depicting a lateral side of the locker depicted in FIG. 12;

FIG. 14 is a schematic depicting a top side of the locker depicted in FIGS. 12 and 13 in combination with an exemplary lid.

DETAILED DESCRIPTION OF THE INVENTION

The invention shall be described with reference to the figures, wherein it is to be understood that the invention shall not be limited to such figures, but shall include any and all modifications thereto as would be obvious to a person of ordinary skill in the art.

Figure 1:
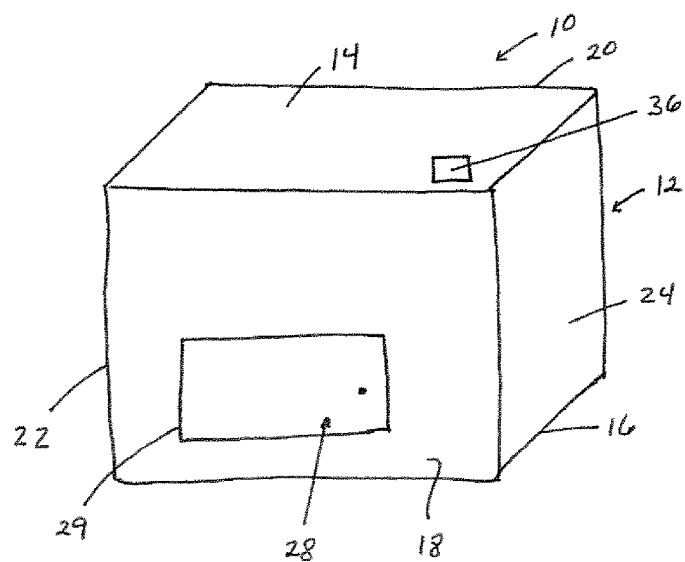
FIG. 1 is a schematic depicting an exemplary merchandiser system depicting an access door in a closed position.
Figure 2:
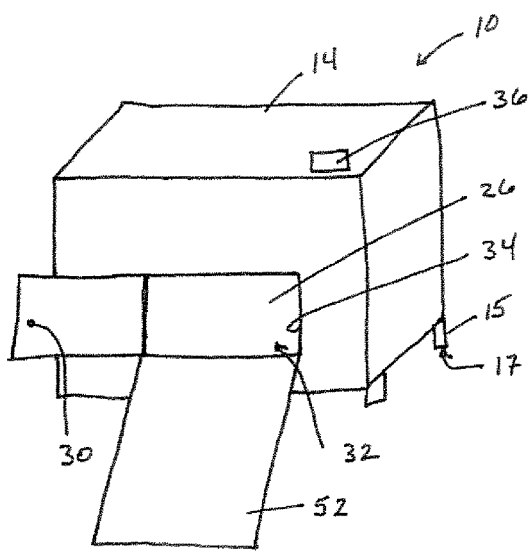
FIG. 2 is a schematic depicting the merchandiser system of FIG. 1, wherein the access door is in an open position.

Referring to FIGS. 1 and 2, a merchandiser system 10 comprises a housing 12 having a top side 14 opposite to a bottom side 16, a front side 18 opposite to a back side 20, and a proximal lateral side 22 opposite to a distal lateral side 24. Top side 14, bottom side 16, front side 18, back side 20, proximal lateral side 22, and distal lateral side 24 surround a chamber 26. Although housing 12 may be formed of metal, in an exemplary embodiment, housing 12 is formed out of molded plastic.

An access door 28 is positioned on front side 18 and provides access to chamber 26. Preferably access door 28 comprises a lateral side 29 which is hingedly attached to front side 18 to permit access door 28 to swing open and close along a horizontal plane. Access door 28 further comprises a latch mechanism 30 which engages with a complementary latch mechanism 32 positioned on a lateral edge 34 of front side 18 to secure closure of access door 28 and to prevent cool air from exiting chamber 26.

Extending from bottom side 16 of housing 12 is a plurality of legs 15. Each leg from plurality of legs 15 comprises a hole 17 formed on an underside thereof.

Merchandiser system 10 further comprises a ramp 52. Ramp 52 may be stored on and/or within housing 12, or may be fixedly attached to housing 12. In an exemplary embodiment, when needed for use, ramp 52 is pulled outwardly and downwardly such that it leads from chamber 26 and extends away from bottom side 16 in a direction opposite from top side 14. Ramp 52 is configured and angled relative to chamber 26 such that it allows a delivery person to roll a tote, such as, e.g., tote 40, filled with inventory into chamber 26 via ramp 52 thereby facilitating the restocking of inventory within chamber 26.

Figure 3:
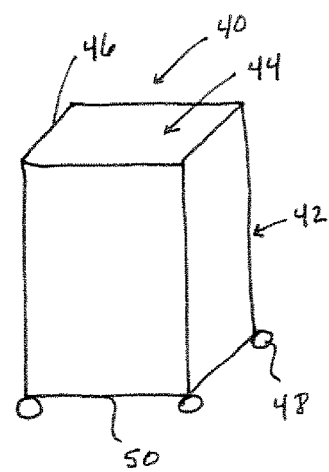
FIG. 3 is a schematic depicting an exemplary tote.

Chamber 26 preferably is configured and dimensioned to hold a plurality of totes, wherein the totes are designed to hold inventory, such as, for example, bags of ice. An exemplary tote 40 is depicted in FIG. 3. Here tote 40 comprises a housing 42 having an opening 44 formed through a top side 46 thereof, wherein inventory may be stored within housing 42 via placement of the inventory within opening 44. Tote 40 further comprises wheels 48 positioned on a bottom side 50 of housing 42.

In an exemplary embodiment, the plurality of totes may be loaded with inventory at the production facility or on the supplier's truck. The plurality of totes, which may comprise variously sized and configured individual totes, may then be moved from the truck to the merchandiser, and positioned within chamber 26 by, for example, rolling the totes up to and on and over ramp 52. Any empty totes may be removed from chamber 26 via ramp 52. An empty tote may be restocked by, for example, rolling the empty tote to the delivery truck and restocking it. Such tote may be positioned back within chamber 26 by rolling the tote up to, on, and over ramp 52. Alternatively, the empty tote may be saved for future use. The benefit with this process is the ease of reloading which includes less strain and lifting on the part of the individual that is loading, and a considerable decrease in the amount of time necessary to transport the inventory and to load the merchandiser.

Top side 14 of housing 12 comprises an aperture 36, wherein aperture 36 is configured and dimensioned to receive a power unit 60. Power unit 60 serves to power, cool, and to regulate the temperature of merchandiser system 10. Power unit 60 is further designed so that it is a self-contained unit which may be easily installed within and removed from housing 12. In this manner, then, when power unit 60 is no longer functioning, it can be removed as a single unit without the necessity for a heating, ventilation, and air conditioning ("HVAC") expert, and a replacement power unit can be installed without any downtime and without losing any inventory within the merchandiser. Additionally, multiple malfunctioning power units may be collected through time, and, when desired an HVAC contractor can be engaged to repair the power units at a time that is convenient for the owner.

Figure 4:
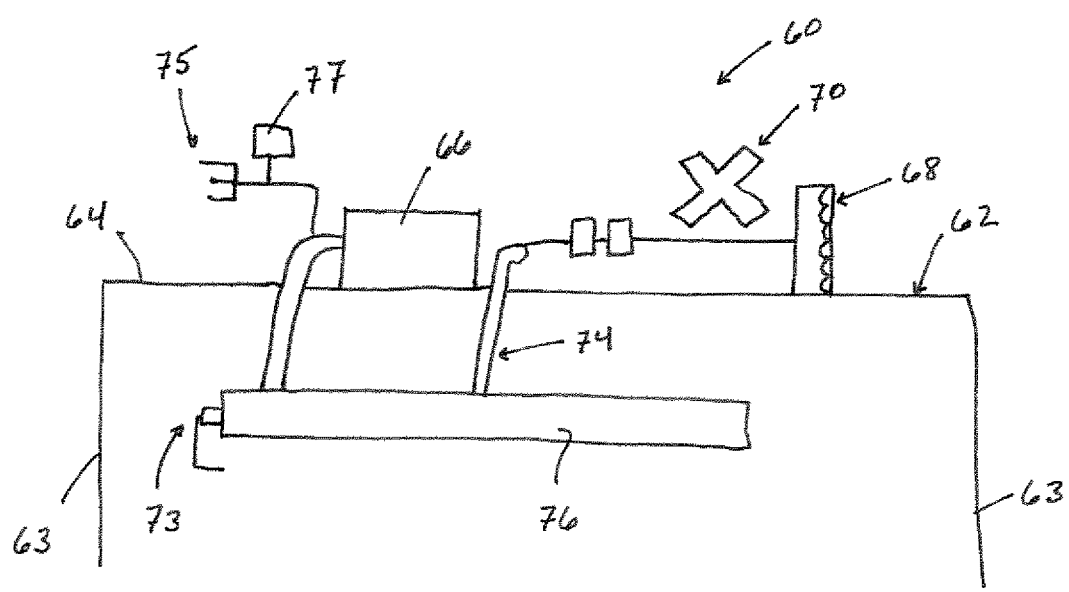
FIG. 4 is a schematic depicting an exemplary power unit.

To meet these ends and referring to FIG. 4, an exemplary power unit 60 comprises a base 62 and a pair of legs 63, wherein each leg of pair 63 is removably attached to base 62. Disposed on a top side 64 of base 62 are a compressor 66, condensing coils 68, a fan 70, and a power cord 75 which provides about 120 volts to power unit 60. Power unit 60 further comprises an auto defrost subunit 74 which is preferably bolted onto base 62. Auto defrost subunit 74 comprises a temperature sensor 73, auto defrost timer 77, and an evaporator coil 76 which, when power unit 60 is properly installed, extends from base 62 into chamber 26 of housing 12. Auto defrost subunit 74 is fed by two refrigerant lines to evaporator coil 76.

Figure 5:
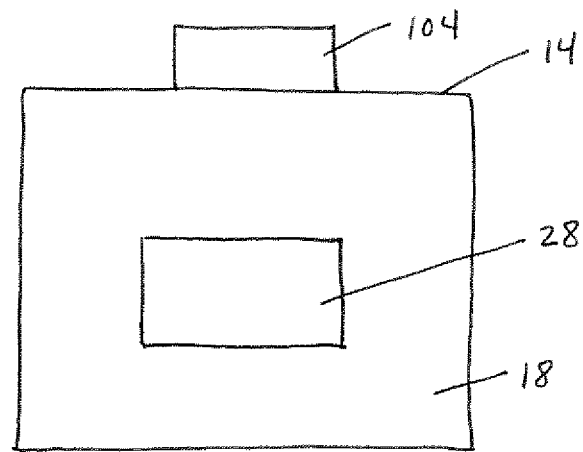
FIG. 5 is a schematic depicting a front side view of an exemplary merchandiser system comprising an exemplary dry ice cover.
Figure 6:
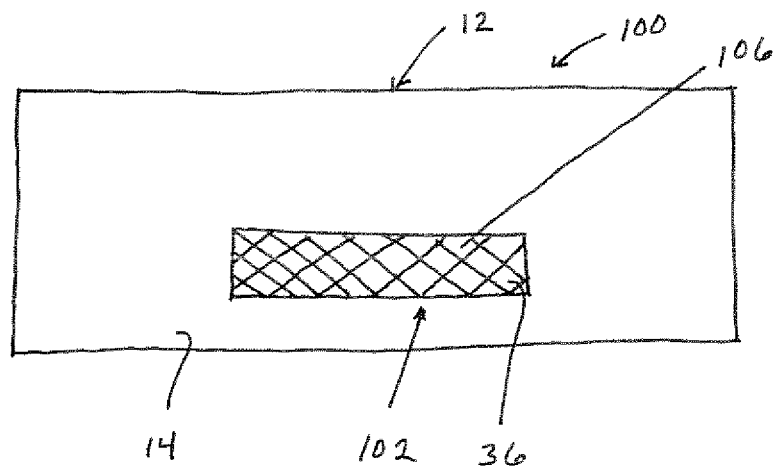
FIG. 6 is a schematic depicting a top side view of the merchandiser system of FIG. 4, wherein the dry ice cover has been removed.

Another exemplary merchandiser is depicted in FIGS. 5 and 6. Here, a merchandiser system 100 is essentially identical to merchandiser system 10, but additionally includes a screen 102 disposed over aperture 36 of top side 14 of housing 12. In an exemplary embodiment, screen 102 comprises a wire mesh having a plurality of ¼ inch square openings. Merchandiser system 100 further comprises a cover 104 which is configured to completely cover a top side 106 of screen 102. When power unit 60 fails to function, dry ice may be placed on top side 106 of screen 102, and, hence, sandwiched between screen 102 and cover 104. In this manner, the dry ice will sublimate into chamber 26, thereby keeping the inventory cool despite the loss of power resulting from a malfunctioning power unit.

As a means of further creating an energy efficient and energy saving cooling system, the merchandiser may be equipped with a canopy which shades the housing of the merchandiser. Such shading serves to increase the life of the inventory, and decreases the amount of electricity that needs to be used to keep the inventory cool. To that end, in an exemplary embodiment, the merchandiser may be equipped with a canopy comprising a canopy material secured to a canopy support.

The canopy material may be selected from a wide variety of materials, wherein the material(s) selected is based upon considerations relating to heat reflection and absorbency.

Figure 7:
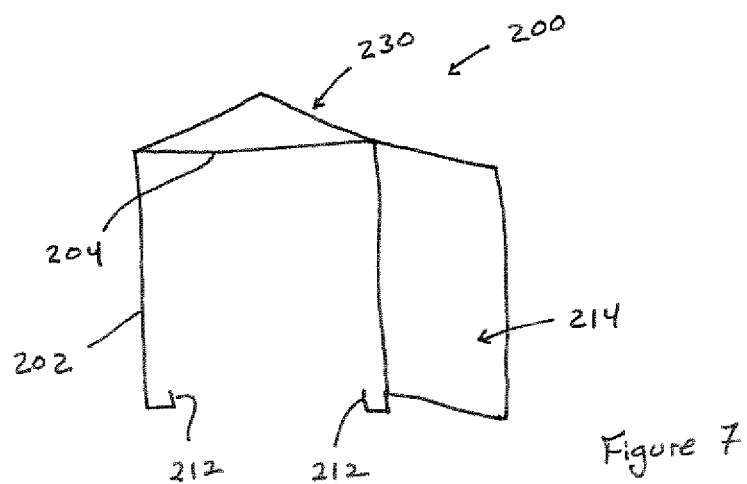
FIG. 7 is a schematic depicting a front side view of an exemplary canopy support.
Figure 8:
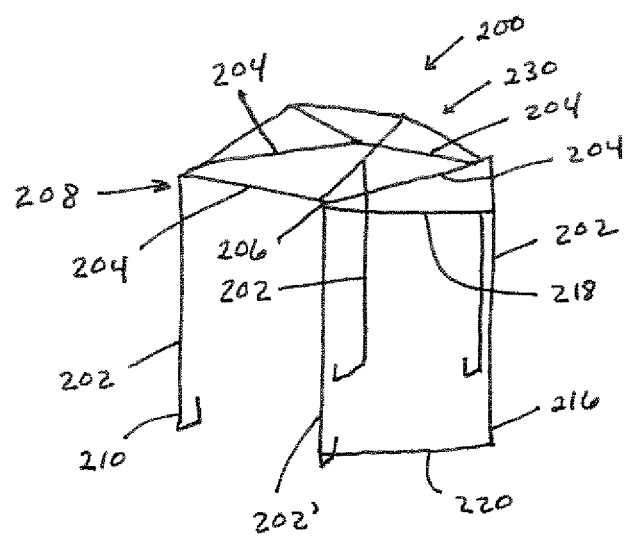
FIG. 8 is a schematic depicting a side perspective view of the canopy support depicted in FIG. 7.

An exemplary canopy support 200 is depicted in FIGS. 7 and 8. As shown in the figures, canopy support 200 comprises four vertically extending rods 202 where rods 202 are interconnected to one another at top ends 206 thereof via horizontally extending rods 204 to form a top portion 208. A Bottom end 210 of each of rods 202 bends inwardly about 90 degrees and then bends upwardly towards top portion 208 at about a 90 degree angle to form a pin member 212. Each of pin members 212 engages with a respective hole 17 of leg 15 of merchandiser system 10 merchandiser system 100 to thereby anchor canopy support 200.

One of vertically extending rods 202 (202') forms a door member 214. In addition to rod 202', door member 214 further comprises a secondary vertically extending rod 216, an upper secondary horizontally extending rod 218, and a lower secondary horizontally extending rod 220, wherein rods 218 and 220 join rod 202' to rod 216. Door member 214 is designed to swing outwardly away from and then back towards canopy support 200. Door member 214 may be swung out of the way allowing the merchandiser's access door to open without obstruction. Alternatively, it may swing from the opposite side of the merchandiser's access door, as this configuration will allow the delivery person the ability to close the door member 214 for any reason while the merchandiser's access door is open, and, thereby conserve electricity.

Extending from top portion 208 is a roof member 230. Roof member 230 comprises a plurality of rods 232 which are arranged to provide a pitched roof structure.

The canopy material (not shown) may be attached to the various rods of the canopy support in a conventional fashion to provide adequate shade to the merchandiser. Additionally, the canopy material may comprise an opening which is aligned with the access door of the merchandiser to allow easy access to the inventory by consumers.

Figure 9:
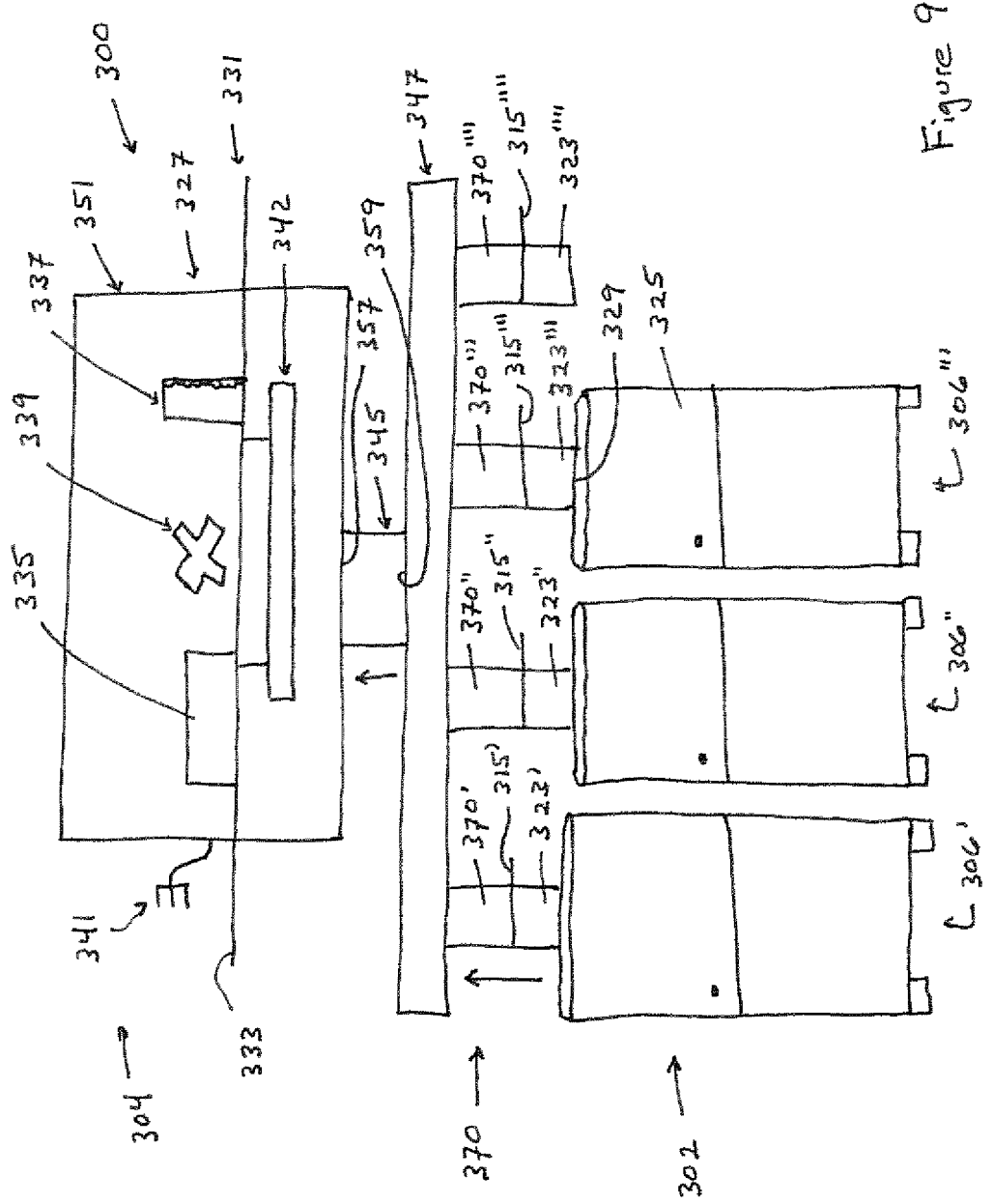
FIG. 9 is a schematic depicting a front side of an exemplary merchandiser system.
Figure 10:
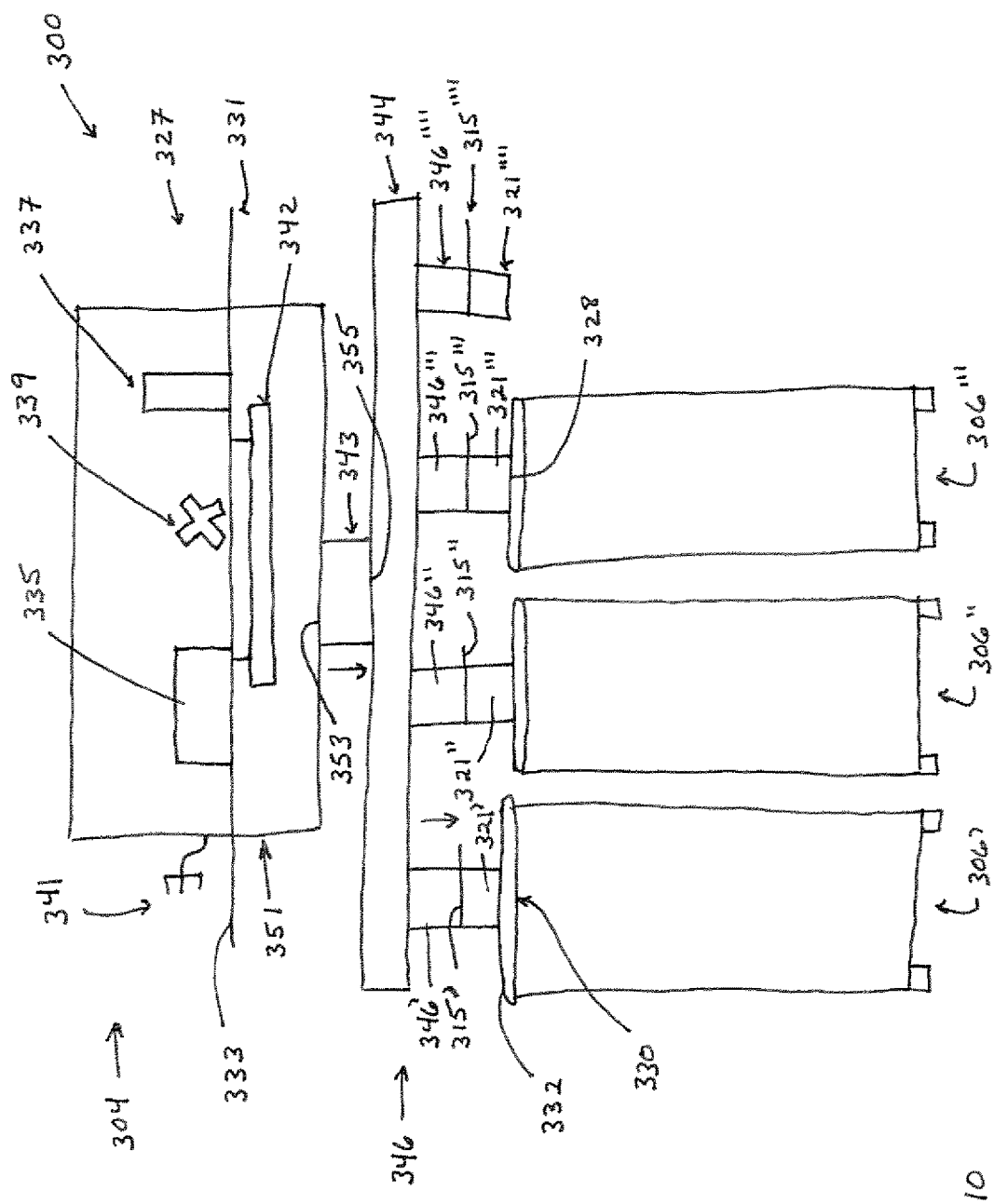
FIG. 10 is a schematic depicting a back side of the merchandiser system depicted in FIG. 9.
Figure 11:
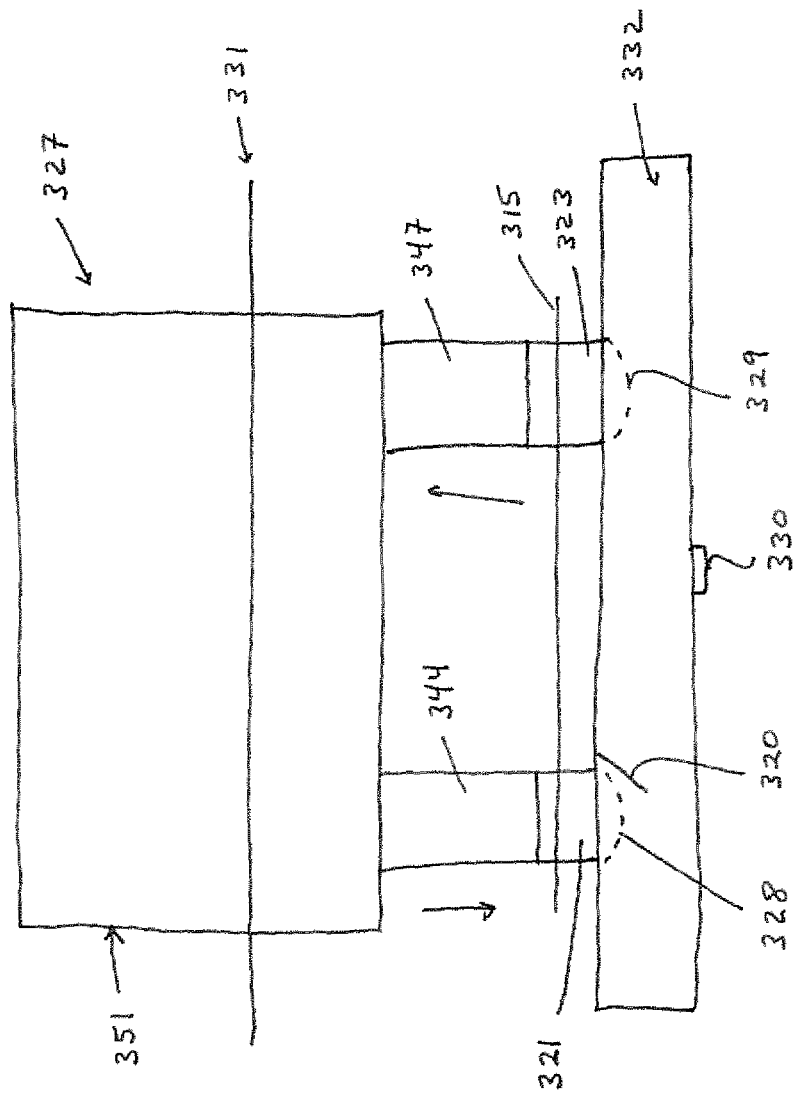
FIG. 11 is a schematic depicting a side view of the merchandiser system depicted in FIGS. 9 and 10.

Another exemplary merchandiser system 300 is discussed herein with reference to FIGS. 9-14. Referring to FIGS. 9-11, merchandiser system 300 comprises a plurality of lockers 302 physically connected to a power unit 304. Each of the lockers from plurality 302 is used to store inventory 350 to be refrigerated such as, e.g., ice, ice cream, frozen perishables, and the like.

Referring to FIGS. 12-14, an exemplary locker 306 of plurality 302 comprises a body 334 having a hollow interior 319 surrounded by a front side 308 oppositely situated to a back side 310, a proximal lateral side 312 oppositely situated to a distal lateral side 314, and an open-ended top side 316 oppositely situated to a bottom side 318.

Body 334 is horizontally divided into an upper portion 320 and a lower portion 322. Front side 308 of upper portion 320 comprises a hinged access door 325 which may be closed and secured via a securing mechanism including, e.g. a lock, a latch mechanism, and the like. A perimeter of access door 325 may be surrounded by a gasket material to create a tight seal, and, thereby contain cold air within interior 319. Wheels or legs 324 may be positioned on bottom side 318, wherein wheels or legs 324 are configured to facilitate movement of locker 306 and/or to provide fork lift access to locker 306.

Merchandiser system 300 further comprises a lid 332 that rests atop top side 316. Lid 332 comprises a top side 336 and an underside 338, wherein a cold air connection opening 328 and a warm air connection opening 329 are formed through top side 336 and underside 338 and are in fluid communication with interior 319. A deflection plate 320 (see FIG. 11) lies immediately adjacent to cold air connection opening 328 on underside 338. Lid 332 may be opened to reveal interior 319, wherein, when in such an open position, inventory may be placed readily within interior 319. Lid 332 may be secured to body 334 via, e.g., a latch 330.

Referring again to FIGS. 9-11, merchandiser system 300 further comprises a power unit 304 which generates and provides cold air to plurality of lockers 302 and which removes warm air therefrom. In an exemplary embodiment, power unit 304 comprises a refrigeration pack 327 in electrical and fluid communication with an evaporation coil 342, wherein refrigeration pack 327 and evaporation coil 342 are contained within a housing 351.

Refrigeration pack 327 comprises a mounting plate 331 having a top side 333 upon which is disposed a compressor 335, a condensing coil 337, a fan 339, and a power cord 341 which is electrically connected to an electrical outlet to provide power to refrigeration pack 327. Condensing coil 337 and compressor 335 are in fluid communication with evaporation coil 342 which is located below mounting plate 331. Refrigerant lines further connect refrigeration pack 327 with evaporation coil 342.

Merchandiser system 300 further comprises a horizontally extending cold air inlet plenum 344 which is in fluid communication with evaporation coil 342 via a cold air inlet 343, wherein cold aid inlet 343 is disposed through an opening 353 of housing 351 on one side thereof and through an opening 355 of cold air inlet plenum 344 on another side thereof, and a horizontally extending warm air return plenum 347 which is in fluid communication with evaporation coil 342 via a warm air return 345, wherein warm air return 345 is disposed through an opening 357 of housing 351 on one side thereof and through an opening 359 of warm air return plenum 347 on another side thereof. Each of air plenums 344 and 347 respectively comprises a hollow interior (not shown) through which the cold air and the warm air generated from power unit 304 respectively flows.

A plurality of cold air distribution ports 346 vertically extend from cold air inlet plenum 344, wherein each of the ports from plurality 346 is in fluid communication with the hollow interior of plenum 344. A plurality of warm air collection return ports 370 vertically extend from warm air return plenum 347, wherein each of the ports from plurality 370 is in fluid communication with the hollow interior of plenum 347.

Although the number of ports in plurality 346 and 370 may comprise any number of individual ports, in an exemplary embodiment, the number of ports forming the respective pluralities is selected based upon the size of the merchandiser and/or the particular needs of the user. Nevertheless, in an exemplary embodiment, a merchandiser will have at least two ports in each of pluralities 346 and 370, and wherein in a further exemplary embodiment, a merchandiser is equipped with at least one port in each of pluralities 346 and 370 in excess of the merchandiser's typical expected demands wherein such extra ports expand the holding capacity of the merchandiser, and, therefore, reduce the need to remove lockers that are not entirely void of inventory.

Each of cold air inlet distribution ports of plurality 346 has a cold air inlet hose 321 connected thereto. Cold air inlet hoses 321 are respectively engaged with cold air connection openings 328 of respective lockers 306, and are, therefore, in fluid communication with respective interiors 319. Similarly, each of warm air collection ports of plurality 370 has a warm air return hose 323 connected thereto. Warm air return hoses 323 are respectively engaged with warm air collection openings 329 of respective lockers 306, and are, therefore, in fluid communication with respective interiors 319.

Each of the ports from pluralities 346 and 370 includes a slide gate 315 which may be oriented in both a closed and an open position. When slide gates 315 are open, ports 346 and 370 are in fluid communication with respective hoses 321 and 323; and when slide gates 315 are closed, ports 346 and 370 are no longer in fluid communication with respective hoses 321 and 323.

As shown in FIG. 10, plurality of cold air distribution ports 346 comprises four drop-down ports, 346', 346", 346"', and 346"", all of which extend from cold air inlet plenum 344. Air inlet hoses 321', 321", 321"', and 321"" are respectively attached to cold air inlet distribution ports 346', 346", 346"', and 346"" and in fluid communication therewith by respective slide gates 315', 315", 315"', and 315"". Plurality of lockers 302 comprises three lockers, 306', 306", and 306"', wherein each of lockers 306', 306", and 306"' is respectively attached to a cold air inlet hose 321', 321", and 321"', and slide gates 315', 315", and 315"' are in an open position. As port 346"" and hose 321"" are not engaged with a locker, slide gate 315"" is in a closed position, thereby preventing the flow of air from hose 321"". A locker may be engaged with hose 321"" once inventory becomes low in any of lockers 306', 306", and 306"' and/or once it otherwise becomes so desired.

Similarly, as shown in FIG. 9, plurality of warm air collection ports 370 comprises four drop-down ports, 370', 370", 370"', and 370"", all of which extend from warm air return plenum 347. Warm air return hoses 323', 323", 323"', and 323"" are respectively attached to warm air collection ports 370', 370", 370"', and 370"" and in fluid communication therewith by respective slide gates 315', 315", 315"', and 315"". Each of lockers 306', 306", and 306"' is respectively attached to hoses 323', 323", and 323"', and slide gates 315', 315", and 315"' are in an open position. As port 370"" and hose 323"" are not engaged with a locker, slide gate 315"" is in a closed position. A locker may be engaged with hose 323"" once inventory becomes low in any of lockers 306', 306", and 306"' and/or once it otherwise becomes so desired.

The merchandiser disclosed herein allows inventory to be packaged at the production facility, thereby eliminating the need to have the delivery driver handle the inventory. Accordingly, in an exemplary embodiment, a driver upon arriving at the delivery site can evaluate the quantity of inventory needed to fill the merchandiser.

After evaluation, the delivery person may then close the slide gates on those ports that directly feed into the respective lockers that are to be removed from the merchandiser, thereby shutting off the air supply through the respective port. The delivery driver may then disconnect and remove the empty locker(s). Empty lockers may be returned to the delivery vehicle. The delivery person may then unload full lockers from the delivery vehicle to replace the removed lockers. Each of the replacement lockers may then be connected to an available port and connected thereto. An exemplary means of connecting the collar to the port may be by way of, e.g., a latching device such as a camlock. The port may then be opened such that air flows into the locker. If the merchandiser is equipped with an extra port, the delivery driver and/or the customer may assess whether an additional locker should be connected to the excess port. Therefore, the additional port allows the driver to meet capacity demands while not having to remove and fill any partially depleted lockers.

Figure 15:
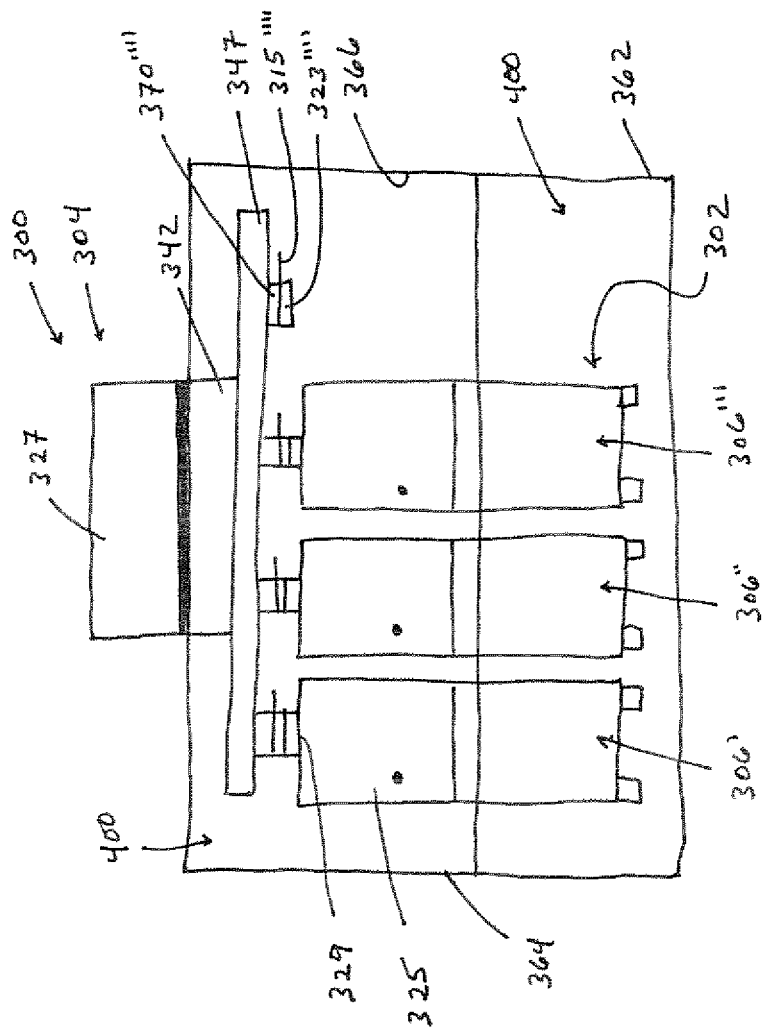
FIG. 15 is a schematic depicting the merchandiser system depicted in FIGS. 9-11 in combination with a canopy.

In a further exemplary embodiment and referring to FIG. 15, a canopy 400 is engaged with power unit 304 and plurality of lockers 302 to provide shade to merchandiser system 300. In an exemplary embodiment, canopy 400 at least partially envelops a top side 360, a back side 362, and lateral sides 364 and 366 of a housing 301. Canopy 402 partially envelops a front side 368 of housing 301 while leaving exposed access doors 325 of lockers 306.

From the foregoing it will be observed that numerous modifications and variations can be effectuated without departing from the true spirit and scope of the novel concepts of the present invention. It is to be understood that no limitation with respect to the specific embodiments illustrated is intended or should be inferred. The disclosure is intended to cover by the appended claims all such modifications as fall within the scope of the claims.

What is claimed is:

1. A method of delivering inventory and installing a locker, comprising:

providing the locker, wherein the locker comprises a body having an open-ended top side which leads into an interior, and a bottom side oppositely situated to the top side;

placing the inventory in the interior of the locker;

placing the locker containing the inventory into a delivery truck;

transporting the locker containing the inventory via the delivery truck to a delivery site wherein the delivery site has a low temperature merchandiser system;

removing the locker containing the inventory from the delivery truck; and installing the locker containing the inventory to the low temperature merchandiser system;

wherein the low temperature merchandiser system comprises:

a power unit comprising a compressor, a condenser, and an evaporator coil in fluid communication with one another;

a horizontally extending cold air inlet plenum in fluid communication with the evaporator coil;

a plurality of cold air distribution ports which vertically extends from the cold air inlet plenum and which is in fluid communication therewith;

a horizontally extending warm air return plenum in fluid communication with the evaporator coil;

a plurality of warm air collection ports which vertically extends from the warm air return plenum and which is in fluid communication therewith;

a plurality of slide gates, wherein each slide gate from the plurality of slide gates connects a cold air distribution port to a warm air collection port and controls a flow of fluid through the respective ports;

a plurality of cold air inlet hoses, wherein each of the cold air inlet hoses is in physical communication with a respective cold air distribution port;

a plurality of warm air return hoses, wherein each of the warm air return hoses is in physical communication with a respective warm air collection port; and a plurality of lids, each lid thereof having a cold air connection opening and a warm air connection opening formed therethrough wherein a cold air return hose from the plurality of cold air return hoses is physically engaged with a cold air connection opening of the plurality and a warm air return hose from the plurality is physically engaged with a warm air connection opening of the plurality.

2. The method of claim 1, wherein installing the locker containing the inventory comprises:

selecting a cold air distribution port and a warm air collection port;

maneuvering the slide gate in communication with the selected cold air distribution port and the warm air collection port to restrict the flow of cold air generated from the power unit through the cold air distribution port;

placing the lid on the top side of the locker such that the cold air inlet hose and the warm air inlet hose are in fluid communication with the interior of the locker; and maneuvering the slide gate in communication with the selected cold air distribution port and the warm air collection port to allow the flow of cold air generated from the power unit through the cold air distribution port and into the interior of the locker, and to further allow the flow of warm air from the interior of the locker through the respective warm air collection port.

3. The method of claim 2, wherein the low temperature merchandiser system further comprises one or more lockers installed on the low temperature merchandiser system, and wherein the method further comprises:

de-installing the one or more lockers from the system;

transporting the de-installed one or more lockers to the delivery truck; and returning the de-installed one or more lockers to a packing site, wherein inventory is placed in the locker at the packing site.

4. The method of claim 3, wherein the locker further comprises one or more wheels disposed on the bottom side thereof, and wherein removing the locker containing the inventory from the delivery truck comprises rolling the locker containing the inventory from the delivery truck via the one or more wheels.

5. A method of delivering inventory and installing a locker, comprising:

providing the locker, wherein the locker comprises a body having an open-ended top side which leads into an interior, and a bottom side oppositely situated to the top side;

placing the inventory in the interior of the locker;

placing the locker containing the inventory into a delivery truck;

transporting the locker containing the inventory via the delivery truck to a delivery site wherein the delivery site has a low temperature merchandiser system;

removing the locker containing the inventory from the delivery truck; and installing the locker containing the inventory to the low temperature merchandiser system;

wherein the low temperature merchandiser system, comprises:

a power unit comprising:

a housing having a top side oppositely situated to a bottom side; and a mounting plate disposed within the housing wherein the mounting plate has a top side oppositely situated to a bottom side;

the power unit further comprising a compressor, a condenser, and an evaporator coil disposed within the housing, wherein the compressor and the condenser are disposed on the top side of the mounting plate and are directed towards the top side of the housing, and the evaporator coil is disposed between the bottom side of the mounting plate and the bottom side of the housing;

a horizontally extending cold air inlet plenum having a top side oppositely situated to a bottom side;

a cold air inlet having an end that vertically extends from a first opening formed through the bottom side of the housing and having an oppositely situated end that vertically extends from an opening formed though the top side of the cold air inlet plenum, wherein the cold air inlet is in fluid communication with the evaporator coil;

a plurality of cold air distribution ports which vertically extends from the bottom side of the cold air inlet plenum, and which is in fluid communication with the cold air inlet and with the cold air inlet plenum;

a plurality of inlet hoses, wherein each hose from the plurality of inlet hoses is physically engaged with one of the cold air distribution ports from the plurality of cold air distribution ports to form an inlet hose/cold air distribution port pair;

a horizontally extending warm air return plenum having a top side oppositely situated to a bottom side;

a warm air return having an end that vertically extends from a second opening formed though the bottom side of the housing and having an oppositely situated end that vertically extends from an opening formed though the top side of the warm air return plenum, wherein the warm air return is in fluid communication with the evaporator coil;

a plurality of warm air collection ports which vertically extends from the bottom side of the warm air return plenum, and which is in fluid communication with the warm air return and with the warm air return plenum;

a plurality of slide gates, wherein each slide gate from the plurality of slide gates connects a cold air distribution port to a warm air collection port and controls a flow of fluid through the respective ports;

a plurality of warm air return hoses, wherein each hose from the plurality of warm air return hoses is physically engaged with one of the warm air collection ports from the plurality of warm air collection ports to form a warm air return hose/warm air collection port pair;

a plurality of lids, each lid thereof having a cold air connection opening and a warm air connection opening formed therethrough wherein a cold air return hose from the plurality of cold air return hoses is physically engaged with a cold air connection opening of the plurality and a warm air return hose from the plurality is physically engaged with a warm air connection opening of the plurality.

6. The method of claim 5, wherein installing the locker containing the inventory comprises:

selecting a cold air distribution port and a warm air collection port;

maneuvering the slide gate in communication with the selected cold air distribution port and the warm air collection port to restrict the flow of cold air generated from the power unit through the cold air distribution port;

placing the lid on the top side of the locker such that the cold air inlet hose and the warm air inlet hose are in fluid communication with the interior of the locker; and maneuvering the slide gate in communication with the selected cold air distribution port and the warm air collection port to allow the flow of cold air generated from the power unit through the cold air distribution port and into the interior of the locker, and to further allow the flow of warm air from the interior of the locker through the respective warm air collection port.

7. The method of claim 6, wherein the low temperature merchandiser system further comprises one or more lockers installed on the low temperature merchandiser system, and wherein the method further comprises:

de-installing the one or more lockers from the system;

transporting the de-installed one or more lockers to the delivery truck; and returning the de-installed one or more lockers to a packing site, wherein inventory is placed in the locker at the packing site.

8. The method of claim 7, wherein the locker further comprises one or more wheels disposed on the bottom side thereof, and wherein removing the locker containing the inventory from the delivery truck comprises rolling the locker containing the inventory from the delivery truck via the one or more wheels.

* * * * *